United States Patent
Ponghis et al.

[11] 3,811,869
[45] May 21, 1974

[54] PROCESS FOR THE REDUCTION OF IRON ORES

[75] Inventors: Nicolas Gerassimo Ponghis, Liege; Arthur Gerard Poos, Embourg, both of Belgium

[73] Assignee: Centre National De Recherches Metallurgiques, Brussels, Belgium

[22] Filed: Mar. 31, 1971

[21] Appl. No.: 129,930

[30] Foreign Application Priority Data
- Mar. 31, 1970  Belgium .............................. 748274
- Mar. 31, 1970  Belgium .............................. 748275
- Apr. 7, 1970   Belgium .............................. 748623
- Apr. 10, 1970  Belgium .............................. 748835
- June 30, 1970  Belgium .............................. 752792
- July 10, 1970  Belgium .............................. 753344
- Sept. 9, 1970  Belgium .............................. 755953
- Oct. 14, 1970  Belgium .............................. 757519

[52] U.S. Cl. ..................................................... 75/42
[51] Int. Cl. ................................................. C21b 5/06
[58] Field of Search ................................... 75/41, 42

[56] References Cited
UNITED STATES PATENTS

| | | | |
|---|---|---|---|
| 2,799,576 | 7/1957 | Gumz et al. | 75/41 |
| 3,458,307 | 7/1969 | Marshall et al. | 75/42 |
| 2,593,257 | 4/1952 | Bradley et al. | 75/41 |
| 3,214,266 | 10/1965 | Whaley | 75/42 |
| 1,917,642 | 7/1933 | Furnas | 75/41 |
| 1,945,341 | 1/1934 | Brassert | 75/41 |
| 2,795,497 | 6/1957 | Elvander | 75/42 X |
| 2,837,419 | 6/1958 | Sellers et al. | 75/41 |
| 2,952,533 | 9/1960 | Cuscoleca et al. | 75/42 X |
| 2,986,458 | 5/1961 | Johnson | 75/40 |
| 3,236,628 | 2/1966 | Von Bogdandy | 75/40 X |

FOREIGN PATENTS OR APPLICATIONS

| | | | |
|---|---|---|---|
| 803,002 | 10/1958 | Great Britain | 75/41 |
| 881,405 | 11/1961 | Great Britain | 75/42 |
| 985,577 | 3/1965 | Great Britain | 75/42 |
| 1,019,135 | 2/1966 | Great Britain | 75/41 |

Primary Examiner—L. Dewayne Rutledge
Assistant Examiner—M. J. Andrews
Attorney, Agent, or Firm—Holman & Stern

[57] ABSTRACT

Iron ore is reduced in a blast furnace. Hot reducing gas is injected into the furnace at the level of the reserve zone; the gas can be reformed gas produced by partial combustion with oxygen of hydrocarbons preheated to about 650°C without pyrolysis. A reducing agent is injected into the furnace at approximately the level of the tuyeres; the agent can be coal-oil slurry, fuel oil, natural gas, or reformed gas.

16 Claims, 2 Drawing Figures

PROCESS FOR THE REDUCTION OF IRON ORES

BACKGROUND OF THE INVENTION

The present invention relates to a process for the reduction of iron ores in blast furnaces, i.e., shaft furnaces in which air is injected into the furnace through tuyeres.

Reduction of iron ores in blast furnaces is produced principally, either directly or indirectly, by means of the carbon which is fed into the furnace in the form of coke with the ore and the fluxes.

In blast furnaces operated in conventional manner coke plays a multiple part, which may be described briefly as follows:

a. The blast blown through the tuyeres causes the partial or total combustion of the coke charge of the furnace. This combustion releases a gaseous mixture mainly consisting of $CO$, $N_2$, and possibly $H_2$, at a temperature of 1,200° to 2,700°C depending on the operating conditions of the furnace and on the physico-chemical properties of the ores processed and of the corresponding metals. This gas performs a double action, heating and reducing the substances forming the charge of the furnace.

b. The reduction of the oxides (e.g., FeO) which cannot be reduced by CO except at high temperature (above 900°C) is accompanied by a secondary reaction known as the "Boudouard reaction" or "solution loss". This secondary reaction consumes carbon, and consequently coke, in a quantity varying according to the operating conditions of the furnace.

c. A small quantity of the coke charge of the furnace serves the purpose of carburizing the molten metal.

Quite generally, the total coke consumption of a blast furnace is made up by the sum of the partial coke consumptions caused by the three mechanisms specified above.

The coke also performs a mechanical function by providing a solid support, referred to as a "coke grid", which allows the motion in counterflow of the gases and liquids (slags, metals, alloys, mattes, and speiss). In principle, this function is performed without consumption of coke.

Owing to the increasing difficulties in the supply of coking coal and to the consequent rise in coke prices, it has been attempted in recent years to reduce the coke rate in the blast furnace.

With this aim, the injection into the furnace has already been performed of heating and reducing agents other than coke, for example liquid or gaseous hydrocarbons such as fuel oil, the injection normally being performed at the level of the tuyeres and usually through these. A method of this nature has rendered it possible to reduce the coke rate by between 5 and 15 percent, depending on the nature of the burden and the quantities of fuel injected.

When users attempted to increase the amount of fuel injected through the tuyeres so as to effect an even greater reduction in the coke rate, they observed that this resulted in an excessive reduction of the flame temperature at the tuyere outlets, which led to bad operation of the furnace, or wastage of fuel due to incomplete combustion, or both. To remedy this the air blast temperature and the proportion of oxygen in the air blast were increased. A reduction of the order of 15 to 20 percent of the coke rate previously needed became attainable on an industrial scale as a result.

For technological reasons it is difficult to increase this reduction by increasing the temperature of the blast still further. Moreover, the increase in the oxygen content of the blast, cannot be pushed beyond a particular level, because the enthalpy of the rising gases is no longer adequate to fulfil the thermal requirements of the upper part of the furnace, such as heating the descending solid substances; this is shown by a detrimental decrease in the temperature of the top gases, among other things.

It was then suggested to replace the injection of fuel performed at the level of the tuyeres, by injection of reformed gas at high temperature into the reserve zone of the furnace (also known as the "1,000°C" level).

The term reformed gas should be understood to refer to any hydrocarbonaceous fluid which had been subjected to an oxidising and/or cracking conversion process whose result is a gaseous mixture containing substantial proportions of hydrogen and/or carbon monoxide. This process is performed by means of an appropriate device frequently referred to as a "reformer;" among other possibilities, it is known that one reformer may be employed for each injection nozzle or for each set of injection nozzles installed in the furnace.

For an even greater increase in the rate of replacement of coke than that actually attainable by known techniques, the present inventors have tried to produce a process for the reduction of iron ores in blast furnaces which renders it possible to effect a considerable reduction in the quantity of coke required, whilst assuring uniform and balanced operation of the furnace.

SUMMARY OF THE INVENTION

The present invention provides a process for the reduction of iron ore in a blast furnace, comprising injecting hot reducing gas into the furnace at the level of the reserve zone, and simultaneously injecting a reducing agent into the furnace at approximately the level of the tuyeres.

DETAILED DESCRIPTION OF PREFERRED EMBODIMENTS

Infection of Hot Reducing Gas

Figure 1:
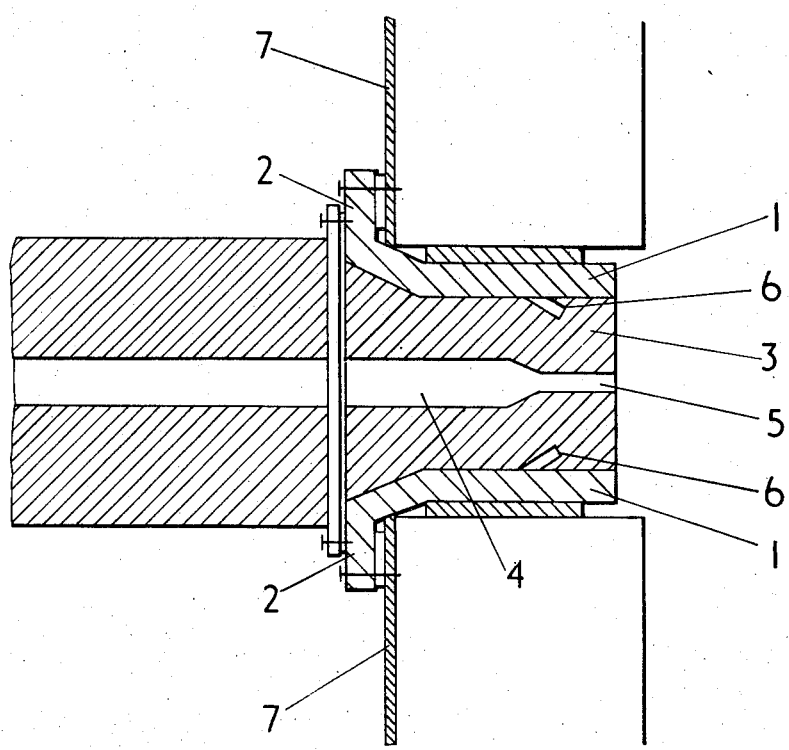
FIG. 1 shows a longitudinal section of an injection nozzle according to the invention.
Figure 2:
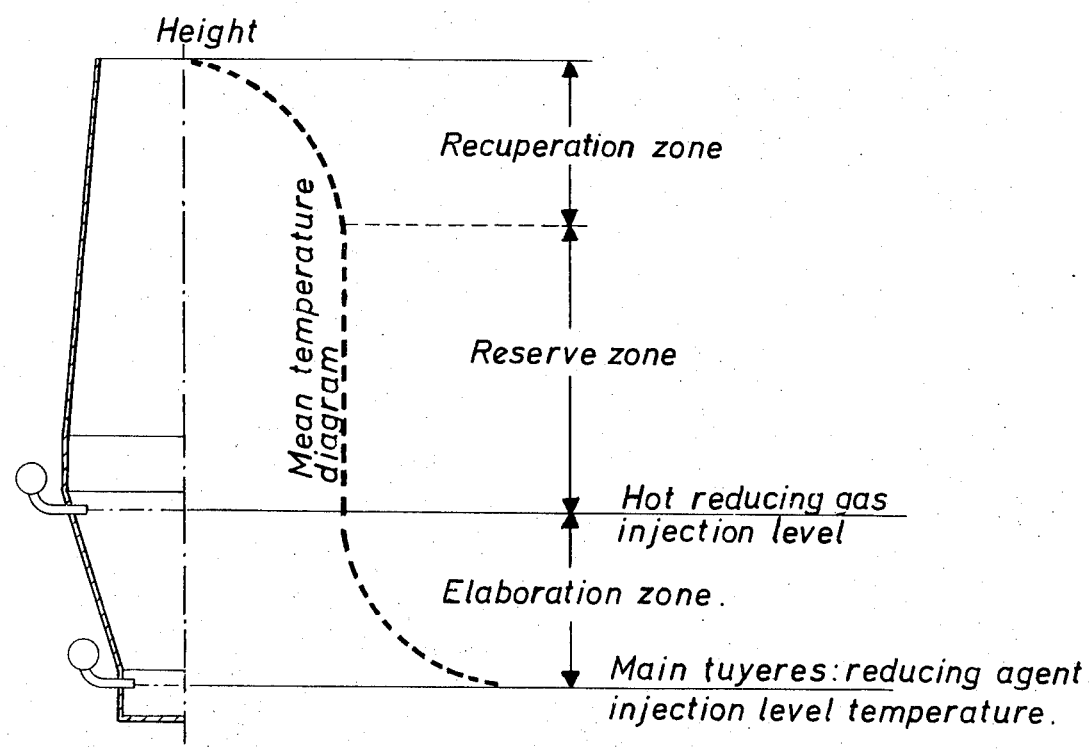
FIG. 2 shows a schematic of a blast furnace showing the zones and injection levels.

The reducing gas injected into the reserve zone (preferably into the lower part of this zone) should have an adequate temperature, of the order of 1,000°C to 1,400°C at the instant of injection, so as not to cause either any cooling during furnace operation or any localised overheating of the charge.

If the temperature of the reducing gas supplied is too high, this may be counteracted by injecting a cooler gas (preferably a reducing gas) at the same time as the hot gas.

In many cases, however, the need for a high injection temperature raises the problem not only of the cost of raising the gas to this temperature and maintaining this temperature, but also of safety, in view of the possible presence of hydrogen, which forms a mixture detonating in contact with air at this temperature.

The process may be carried out irrespective of the nature of the hot reducing gas injected at the level of the reserve zone of the furnace. In particular, the reducing gas may principally contain carbon monoxide and/or hydrogen, obtained by any appropriate process.

It is particularly advantageous to inject reformed gas into the reserve zone, either alone or mixed with another reducing gas.

Production of Reformed Gas

In theory, with gaseous hydrocarbons, the reforming operation consists in performing the combustion of the hydrocarbons with oxygen in adequate quantity to produce carbon monoxide and hydrogen. It is observed however that, in the case of cold gaseous hydrocarbons, the combustion reactions are not sufficiently exothermic to generate the high temperature required for a satisfactory reforming treatment. Consequently, it is necessary in practice to perform the combustion of cold gaseous hydrocarbons with a higher quantity of oxygen than that which is strictly required to produce pure carbon monoxide and hydrogen. This surplus of oxygen allows the production of carbon dioxide and water by reactions which are strongly exothermic; a higher temperature is obtained, but at the expense of the reducing potential of the reaction products. It is thus apparent that the technique commonly applied at present for the reforming of cold gaseous hydrocarbons has solved the problem of high temperature required, but that the reformed gas produced contains a definite proportion of $CO_2$ and $H_2O$, which entails the risk of decreasing the applicability of these gases, whose essential quality is reducibility.

The present inventors have devised a reforming process which renders it possible to eliminate this drawback, that is to say rendering it possible to obtain an adequate temperature for the satisfactory evolution of the reforming treatment whilst decreasing the undesirable reactions forming $CO_2$ and $H_2O$ to an acceptable level. According to this process, the cold gaseous hydrocarbons which are to be reformed are preheated to a temperature (about 650°C, for example) which is just below that at which soot appears (owing to pyrolysis), and the preheated gaseous hydrocarbons are subjected to partial combustion in the presence of a quantity of oxygen (preferably preheated) sufficient to produce CO and $H_2$.

It has been observed experimentally that, if gaseous hydrocarbons are thus preheated, the combustion reactions which are the essence of reforming proceed satisfactorily without the need to maintain a substantial surplus of oxygen in the presence of the gaseous hydrocarbons. The process is of special interest if the hydrocarbon to be reformed is natural gas.

As a rule the reformed gas such as that obtained in the manner described above, is not at a high enough temperature for injection into the reserve zone, and must be raised to a temperature of 1,000° to 1,400°C by any appropriate means.

As stated above, the fact that one may inject gases other than those resulting from the oxidant conversion and thermal cracking of liquid or gaseous hydrocarbonaceous fluids originating, for example, from oil refineries or direct from natural deposits, represents only a particular method of application of the invention. In point of fact, steel works have blast furnaces and coke ovens with a daily production of great quantities of gases containing CO and $H_2$ in particular, and these gases are appropriate to form sources of reducing gas analogous to reformed gas by application of an appropriate treatment.

Use of Blast Furnace Gas and Coke Oven Gas

Thus, at least part of the hot reducing gas injected into the furnace may be made up of appropriately processed blast furnace top gases and/or coke oven gases.

The processing of the blast furnace gases and the coke oven gases may comprise a cooling action sufficient to removal of $H_2O$ and $CO_2$ in the case of blast furnace gases, and $CO_2$ and hydrocarbons such as $CH_4$ in the case of coke oven gases.

It may be advantageous for the treatment by cooling to be supplemented by a scrubbing treatment employing an appropriate liquid. The liquids obtained after the cooling and washing treatments are advantageously recycled into their corresponding circuits. These liquids may then be processed for the purpose of subsequent recovery of the by-products which they may contain, such as hydrocarbons ($CH_4$, etc.) and $CO_2$, for example. The hydrocarbons ($CH_4$, etc.) contained in the coke oven gases may be subjected to a catalytic or oxidant and/or thermal treatment, either before or after their separation following appropriate treatment of the coke oven gases.

Infection Nozzle

It is evident that the injection of hot reducing gas into the reserve zone of the blast furnace may be performed, whatever the kind of gas, by means of an appropriate device. Results of special interest have been obtained, however, by employing injection nozzles of silicon carbide or of refractory material based on silicon carbide, such as refractory cement.

In one particular arrangement, the injection nozzles employed have their longitudinal axis downwardly inclined and subtend an acute angle with the vertical, so that the substances injected penetrate into the blast furnace in the same direction as that of the descent of the charge. The acute angle subtended between the longitudinal axis of the blast nozzles and the vertical is preferably smaller than 20°.

It will be grasped immediately that the use of nozzles similar to the conventional hot blast tuyeres, cooled by water circulation, would be undesirable, since they would cause excessively large thermal losses.

Another condition which should be fulfilled by these injection nozzles is that of assuring adequate penetration of the hot gas into the blast furnace; the nozzles used should have an internal profile specially shaped for this purpose. However, the gas to be injected contains reducing gases, such as CO and $H_2$ in particular, at high temperatures, so that the material of which the injection nozzles are made is in contact with a very aggressive environment; they must be capable of withstanding this chemically and mechanically unless their internal profile is to deteriorate rapidly, with resultant difficulty with fluid flow and penetration into the blast furnace.

The present invention provides a process for performing the said injections by means of nozzles consisting of silicon carbide or of any other refractory material comprising silicon carbide.

Such an injection nozzle is illustrated by way of example only, in the accompanying drawing, in which the nozzle is shown in longitudinal section. This injection nozzle has an external casing having a circular-cylindrical body 1, which is enlarged at one end. This end has a flange 2 for fastening the nozzle to the outer case 7 of the blast furnace and to the feed duct. This outer casing consists of a metallic substance possessing satisfactory resistance to mechanical and chemical attack at high temperatures.

The nozzle has an internal lining 3 with a central passage 4 whose longitudinal profile converges, at the outlet end of the passage, to a constriction 5 of circular cross-section with a constant diameter. The internal lining 3 is a refractory material having a smooth internal surface so as to ensure, in particular, regular flow of the gas to be injected.

The profile of the central passage 4 may alternatively be that of a Laval tube or a Venturi tube.

The external casing may advantageously have one or more longitudinal notches intended to impart an elasticity sufficient to prevent deterioration of the refractory lining caused by deformation of the external casing on alternate heating and cooling. The external casing is advantageously of steel and in particular a special steel, preferably stainless steel, or of an alloy possessing high mechanical and chemical strength at high temperatures. This high strength is needed to prevent any hydrogen leakage, which could be very dangerous at the high temperatures used.

To ensure a smooth surface on the refractory lining, this lining is advantageously a refractory cement which is mouldable, very fine-grained, and possesses high strength at high temperatures.

The distance to which the nozzle extends into the opening provided for this purpose in the furnace wall is less than the thickness of this wall, so that the refractory lining of the furnace protects the nozzle against wear.

The body of the outer casing has internal projections in the form of retaining pegs 6 or steps (not shown), which project into the lining 3, for solidly securing the lining 3 and absorbing any strain to which it could be exposed.

At least one cooling chamber (not shown) may be incorporated close to the tip of the nozzle. For example, the refractory lining 3 can have an annular cavity surrounding the constriction 5, this cavity would be cooled by water circulation, for example.

In one structural application which is of interest, the duct feeding reducing gas to the nozzle is connected to a circular gas main or "torus" (not shown) surrounding the furnace substantially at the level at which the injection is to be performed. The duct feeding the gas from the torus to the nozzle, and possibly including the latter, advantageously has a carefully applied thermal insulation, for example a refractory brick lining.

Infection of Reducing Agent

Having thus dealt with the injection of hot reducing gases into the reserve zone of the furnace, we will now discuss the injection of reducing agents approximately at the level of or through the main tuyeres.

These reducing agents which usually consist of materials containing carbon and/or hydrogen, may be solid, liquid, or gaseous, or may consist of a mixture of these phases. For example, it is possible to employ coal-oil slurry, hydrocarbons of various types and preferably even extra-heavy fuel oil, and gaseous hydrocarbons such as natural gas in particular. It is also possible to inject reformed gas at approximately the level of the tuyeres; the reformed gas may be obtained in any of the ways described above. Similarly, blast furnace and/or coke oven gases may be used, if processed as explained above.

The reducing agents are preferably injected into the furnace at a temperature of between 1,700°C and 2,400°C. The heating of the reducing agents may be performed by any appropriate known means, for example by heat exchangers, electrical heaters, etc.

The injection of the reducing agents may be performed by known injection devices, including conventional tuyeres, or by the injection nozzle described above.

GENERAL OPERATION

It is particularly advantageous to inject the hot reducing gas into the reserve zone in such a way that the gas injected is distributed in a peripheral column along the walls of the shaft. It is also advantageous to feed in the reducing agent or agents in such a way that the resulting reducing gases occupy the centre of the shaft after leaving the lower part of the furnace. To achieve this, it is advisable to select the shapes and sizes of the injection nozzles carefully, as well as the gas pressure and flow speeds.

Since the operation of the furnace or, in other words, the quality (analysis and temperature) of the metal or alloy produced depends on the temperature of injection of the reducing gas, it is possible to regulate the operation of the furnace by any means which can influence this temperature.

Regulation of the furnace operation may advantageously be performed by selective injection of substances having a heating or cooling effect, in particular by injection (simultaneously with the hot reducing gas and agents) of a cooler reducing agent or gas, or selective injection of mixtures of hot or cold reducing and oxidising substances.

Suitable reducing substances are hydrocarbons, solid or liquid products containing carbon, hydrocarbonaceous gases, or gases containing $CO$, $CO_2$, $H_2$, or $H_2O$. Suitable oxidising substances are gases or vapours containing oxygen which is uncombined or in chemical combination with carbon or hydrogen, such as air, oxygen-enriched air, oxygen, $CO_2$, and $H_2O$.

Such injections may also be performed between the level of the tuyeres and the level of the reserve zone.

The satisfactory operation of the blast furnace may also be controlled by appropriate modification, in the course of time, of the relative rates of injection at the level of the tuyeres, at the level of the reserve zone, and between these two levels. These injections may even be alternating or pulsatory, for instance.

Moreover, it is not beyond the scope of the present invention to perform a simultaneous oxygen enrichment of the air blast supplied to the tuyeres.

It has been found in practice that the double injection of reducing gas and reducing agent eliminates a large part of the heating coke and the coke needed for the Boudouard reaction, whilst fulfilling the necessary metallurgical conditions of the process, which are basically the supply of the thermal and chemical-reduction requirements of the furnace.

Example

The following table summerises the characteristics of a furnace in which tests on the process described above have been performed. The columns headed Reference apply to normal operation, with injection at only one level or without injection, and the column headed Inventive Process applies to normal operation with simultaneous injection of extra-heavy fuel into the tuyeres and of reformed gas at the level of formation of wüstite at 1,000°C.

The installation (not shown) for the production and injection of reformed gas comprises:
1. A central plant where the reforming of a hydrocarbon (natural gas in this case) is performed catalytically; the plant is supplied with hydrocarbon through an appropriate pipe network.
2. A piping system for conveying reformed gas at low temperature from the reforming plant to the various points of application, including the blast furnace in question.
3. Near to the blast furnace, apparatus for heating the cold reformed gas to the temperature required for its injection into the blast furnace.
4. Injection nozzles.

| Characteristics | Reference | | Inventive Process | |
|---|---|---|---|---|
| Lower Injection | | | | |
| Extra-heavy fuel (kg/t) | — | 62 | — | 155 |
| Upper Injection | | | | |
| Reformed gas (Nm³/t) | — | — | 290 | 280 |
| Blast | | | | |
| Temperature (°C) | 1020 | 1020 | 1020 | 920 |
| Oxygen (%) | 21 | 31.5 | 21 | 26 |
| % Dry Coke (kg/t) | 648 | 563 | 515 | 372 |

We claim:
1. A process for the reduction of iron ore in a blast furnace, comprising the steps of injecting reducing gas at a temperature between 1,000°C and 1,400°C into the lower part of the reserve zone in the furnace; injecting oxygen-enriched air into the furnace through the tuyeres; and injecting a reducing agent at a temperature between 1,700°C and 2,400°C into the furnace at approximately the level of the tuyeres, all injections carried out simultaneously, so as to reduce the quantity of coke required while assuring uniform and balanced operation of the furnace.

2. A process as claimed in claim 1, further comprising performing said injections by means of nozzles consisting of refractory material comprising silicon carbide.

3. A process as claimed in claim 1, further comprising injecting the hot reducing gas downwards at an acute angle to the vertical.

4. A process as claimed in claim 1, in which the reducing agent comprises at least one hydrocarbon.

5. A process as claimed in claim 1, in which the reducing agent comprises a reducing gas.

6. A process as claimed in claim 1, in which the reducing gas comprises at least one gas selected from the group consisting of carbon monoxide and hydrogen.

7. A process as claimed in claim 1, in which the reducing gas comprises reformed gas.

8. A process as claimed in claim 7, in which the reformed gas is produced by a process comprising preheating a gaseous hydrocarbon to a temperature of about 650°C and just below that at which soot appears, and subjecting the preheated gaseous hydrocarbon to partial combustion in the presence of sufficient oxygen for optimum formation of CO and $H_2$.

9. A process as claimed in claim 8, further comprising preheating the oxygen.

10. A process as claimed in claim 1, in which the hot reducing gas comprises gases selected from the group consisting of blast furnace top gases and coke oven gases which have been processed so as to be rich in CO and $H_2$.

11. A process as claimed in claim 10, in which the processing of said gases comprising cooling the gases sufficiently to remove $H_2O$ and $CO_2$ in the case of top gases, and $CO_2$ and hydrocarbons in the case of coke oven gases.

12. A process as claimed in claim 1, in which the hot reducing gas is injected into the reserve zone in such a manner that the injected gas is spread into a peripheral column along the walls of the shaft.

13. A process as claimed in claim 12, in which the reducing agent is injected in such a manner that the resulting gases occupy the center column of the shaft after leaving the lower part of the furnace.

14. A process as claimed in claim 1, further comprising controlling the operation of the furnace by performing injections having a heating or cooling effect.

15. A process as claimed in claim 14, in which the injection having a heating or cooling effect are performed between the level of the tuyeres and the level of the reserve zone.

16. A process as claimed in claim 15, comprising controlling the furnace operation by regulating the relative rates of injection at the level of the tuyeres, at the level of the reserve zone, and between these two.

* * * * *